Patented Oct. 10, 1944

2,359,972

UNITED STATES PATENT OFFICE 2,359,972

SHELLAC SUBSTITUTE

John M. De Bell, Long Meadow, Mass., assignor to Hercules Powder Company, Wilmington, Del., a corporation of Delaware No Drawing. Application November 7, 1941, Serial No. 418,188

5 Claims. (Cl. 106—37)

This invention relates to thermoplastic compositions having chemical and physical properties corresponding closely to those of shellac, and hence adapted to at least partially replace shellac in many of its applications, particularly in the manufacture of sound reproducing records.

In spite of the great strides made by synthetic resins over the past two decades, one of the natural resins, shellac, has remained unequalled for certain particular applications in the molding and protective coating arts. Thus, for example, none of the commercially available synthetic resins has been able to replace shellac in the manufacture of inexpensive spirit varnishes and insulating compositions. Similarly, shellac possesses an unusual combination of properties, e. g., excellent thermoplastic flow, freedom from cold flow, chemical stability, low cost, etc., which renders it unique for the manufacture of phonograph records. None of the various synthetic resin and cellulose derivative compositions which have heretofore been proposed for the manufacture of phonograph records have proved satisfactory, either from a technical or economic standpoint, and the recent increase in the popularity of the phonograph and the use of recordings and transcriptions in radio broadcasting, together with the potential difficulty of obtaining shellac from its foreign sources, have given rise to a further search for shellac substitutes, particularly ones adapted for use in the phonograph record field.

Now in accordance with this invention it has been found that compositions comprising a major proportion of a substantially petroleum hydrocarbon insoluble resin derived from pine wood and minor proportions of ethylcellulose and a plasticizing agent for the same have chemical and physical properties very closely approximating those of natural shellac. Such compositions, for example, are soluble in alcohols, ethers, halogenated hydrocarbons, aromatic hydrocarbons, etc., and accordingly may be employed in the same manner as shellac in the preparation of spirit varnishes and similar coating compositions. They also have good dielectric properties, and may be used in the same manner as shellac for insulating purposes. Similarly, the compositions provided by the invention may be combined with fillers, lubricants, pigments, resins, etc., in the same manner as shellac to form thermoplastic molding compositions which have molding characteristics substantially the same as those of similar compositions comprising shellac, and articles molded from such compositions have surface characteristics and strength properties substantially the same as articles molded from shellac compositions. For these reasons, the new compositions are especially adapted for use as complete or partial substitutes for shellac in various molding compositions, particularly those employed in the manufacture of phonograph records.

The material which constitutes the major component of the new compositions and which is herein referred to as "a substantially petroleum hydrocarbon insoluble pine wood resin" is the resinous material which may be isolated from pine wood, preferably from stump pine wood, in the following manner: The pine wood, which may or may not have been steamed to remove volatile constituents such as turpentine and pine oil, is extracted with a coal tar hydrocarbon such as benzene or toluene, and the extract is then freed of volatile constituents leaving a resinous residue consisting of a mixture of wood rosin and the resin used in the present compositions. Extraction of this residue with a petroleum hydrocarbon, such as gasoline, dissolves and removes the rosin. After separation of the rosin, which is high in abietic acid, a resinous residue remains which is low in abietic acid and which comprises the resin employed according to the present invention. Alternatively, the residue of the initial coal tar hydrocarbon extract may be treated with a mixture of a petroleum hydrocarbon and furfural, and the two layers which form are separated. The petroleum hydocarbon insoluble resin is found dissolved in the furfural, from which it may be separated by evaporation of the furfural. Other known methods of isolating this resin may be employed, and, if desired, it may be steamed or heat-treated to remove volatile constituents.

This resinous material is characterized by a dark red-brown color, cherry red in solution, and by substantial insolubility, i. e., 85 per cent or greater, in petroleum hydrocarbons, but it will vary somewhat in its specific characteristics, such as acid number, melting point, solubility in aromatic hydrocarbons, etc., depending upon the details of the extraction process utilized. However, it will usually meet the following specifications: Substantial insolubility in petroleum hydrocarbons, substantially complete solubility in alcohol, a methoxy content from about 3 to about 7.5 per cent (usually from about 4 to about 6 per cent), an acid number between about 80 and about 110, and a drop melting point between about 95° C. and about 125° C.

The ethylcellulose employed in the new compositions is of the type soluble in organic solvents and having an ethoxyl content between about 41 and about 51 per cent, preferably between about 44 and about 49 per cent. Its viscosity characteristics may vary widely, the higher viscosity types imparting greater toughness to the composition, whereas the lower viscosity types impart slightly better flow characteristics. In general, an ethylcellulose having a viscosity above about 2 seconds, preferably above about 20 seconds (measured by noting the time of fall of a $\frac{1}{8}$ inch steel ball through ten inches of a 20 per cent by weight solution of the ethylcellulose in an 80:20 toluene-ethyl alcohol mixture in a 25 millimeter diameter glass tube at 25° C.) will be found most satisfactory.

The plasticizing agents employed in preparing the new compositions may be any of the many materials known to exert a plasticizing action on ethylcellulose, and compatible with the ethylcellulose-resin mixture. Examples of such plasticizing agents include high-boiling esters of phosphoric acid, such as triphenyl phosphate, tricresyl phosphate, diphenyl mono-(o-xenyl) phosphate, etc.; halogenated hydrocarbons, such as chlorinated naphthalene and chlorinated diphenyl; esters of phthalic acid, such as dibutyl phthalate, diamyl phthalate, diethoxyethyl phthalate, ethyl phthalyl ethyl glycolate, etc.; natural and synthetic glycerides, such as castor oil, cocoanut oil, glyceryl tripropionate, etc.; higher fatty acid esters, such as butyl stearate and butyl acetyl ricinoleate; amides, such as o- and p-toluene sulfonamides; resin acid esters, such as methyl abietate and hydrogenated methyl abietate; etc. Of the many plasticizing agents available, castor oil has been found particularly suitable for use according to the present invention because of its low cost and excellent plasticizing action on the mixture of the substantially petroleum hydrocarbon insoluble pine wood resin and ethylcellulose.

While the proportions of the various ingredients of the new compositions may be varied somewhat depending upon the type of ethylcellulose and particular plasticizing agent employed, such proportions should not extend appreciably beyond the following limits:

| | Per cent by weight |
|---|---|
| Substantially petroleum hydrocarbon insoluble pine wood resin | 60–80 |
| Ethylcellulose | 10–30 |
| Plasticizing agent | 5–30 |

The use of substantially more than about 80 per cent by weight of the resin gives rise to compositions which are considerably more brittle and more difficult to mold than shellac, whereas the use of substantially more than about 30 per cent by weight of ethylcellulose gives rise to compositions which lack the hardness of shellac. Similarly, the use of substantially more than about 30 per cent by weight of the plasticizing agent gives rise to compositions which are considerably softer and tackier than shellac. A composition which has been found particularly well suited as a substitute for shellac in molding compositions consists of between about 65 and about 75 per cent by weight of the substantially petroleum hydrocarbon insoluble pine wood resin, between about 15 and about 25 per cent by weight of ethylcellulose, and between about 5 and about 15 per cent by weight of a natural glyceride plasticizing agent.

The compositions provided by the invention are conveniently prepared simply by mixing or colloiding the ingredients in any suitable manner, preferably with the aid of heat, until homogeneity is attained. According to one mode of operation, the desired quantities of the substantially petroleum hydrocarbon insoluble pine wood resin, ethylcellulose and plasticizing agent are colloided in a heated Banbury-type mill. The mill is maintained at a temperature sufficiently high to colloid the mass efficiency, but should not be allowed to rise too high. Thus, for example, the mixing operation may be started at 280–300° F. and mixing continued until the temperature has fallen to 150–200° F. If the mass is not homogeneous by this time, the temperature may then be raised to 280–300° F. and the operation repeated. Alternatively, the mixing operation may be carried out on a suitably heated two-roll mill. Upon completion of the mixing operation, the mass is allowed to cool, after which it may be ground to a granulated or flaked form similar to shellac.

The compositions may also be prepared with the aid of solvents, for example by dissolving the separate ingredients in a neutral solvent, such as acetone, and thereafter evaporating off the solvent to obtain a completely homogeneous composition. They may also be prepared simply by mixing the ingredients in molten form, in which case, however, careful control of temperature should be exercised to avoid degradation of the composition.

The following examples will illustrate the preparation of several compositions typical of those provided by the invention, but are not to be construed as limiting the same.

*Example 1*

Approximately 21 parts by weight of ethylcellulose (200 sec. viscosity, 46.8–48.5% ethoxyl) were placed on a two-roll mill and mixed with 7 parts by weight of raw castor oil at a temperature of about 220°–230° F. After thorough mixing, approximately 72 parts by weight of substantially petroleum hydrocarbon insoluble pine wood resin were added, and mixing was continued until a homogeneous composition was obtained. The soft plastic mass was then removed from the rolls in sheets, allowed to cool, and was ground to a coarse powder. This powder was somewhat darker in color than powdered shellac, but otherwise resembled it closely as regards solubility, molding characteristics, physical strength, stability, etc. Thus, for example, it was readily compression molded at a temperature of about 220–230° F. under about 4000 lbs./sq. in. pressure (4 per cent by weight of zinc stearate being employed as a mold lubricant) to form smooth accurate moldings having an average flexural strength of about 3000 lbs./sq. in. and an average modulus of elasticity of about 120,000 lbs./sq. in.

*Example 2*

A composition which was somewhat tougher and more flexible than that described in Example 1, and which was accordingly somewhat better adapted to replace shellac in coating compositions, was prepared by mixing 60 parts by weight of the substantially petroleum hydrocarbon insoluble pine wood resin, 20 parts by weight of ethylcellulose, and 20 parts by weight of raw castor oil in a steam-jacketed Banbury mixer at a temperature of about 280° F. When the mixture was completely colloided, it was removed from the mixer, allowed to cool, and ground to a coarse powder.

*Example 3*

A composition especially suited for use as a shellac substitute in the manufacture of hard molded objects was prepared by colloiding 80 parts by weight of substantially petroleum hydrocarbon insoluble pine wood resin, 15 parts by weight of ethylcellulose, and 5 parts by weight of raw castor oil on a heated two-roll mill. During the milling, the temperature was varied in cycles from about 280–300° F. to 150–200° F. and back again. The mixture was then removed from the rolls in sheets, allowed to cool, and ground in a Wiley mill to form a molding powder.

As hereinbefore pointed out, the compositions provided by the invention may be employed in the same manner as shellac as a full or partial equivalent thereof. Thus, they may be dissolved in suitable solvents, such as methanol, ethanol, benzene, toluene, etc., or mixtures thereof, to form spirit varnishes for use as non-blocking label coatings or as wood finishes. Likewise, these compositions may be employed directly in the molten state as impregnants for cloth, paper and other fibrous materials, or as electrical insulating media.

Similarly, when used in the formulation of molding compositions, such as those employed in phonograph record manufacture, the present compositions are thoroughly mixed with the usual mineral and cellulosic fillers, coloring agents, mold lubricants, resin, etc., in the customary manner. Among the mineral fillers which have been found suitable are china clay and other fine smooth clays, finely ground slate, barytes or precipitated barium sulfate, kieselguhr, silica powder, carbon black, marble flour, whiting, titanium dioxide and zinc oxide. Such fillers are usually employed in amounts ranging from about 30 to about 60 per cent by weight of the entire composition, one of the advantages of the new shellac substitute being that it will tolerate relatively high proportions of fillers. Cellulosic fillers such as cotton flock, wood flour, etc., may also be employed, although preferably only in small proportions because of their sensitivity to moisture. Suitable mold lubricants include natural waxes such as montan wax, japan wax, carnauba wax, etc.; stearic acid and insoluble metal salts thereof such as magnesium stearate and zinc stearate; paraffin wax; etc. Such materials improve the thermoplastic flow of the molding compositions, improve the smoothness of the molded surface, and facilitate mold release. They are usually employed in amounts less than 5 per cent by weight of the entire composition.

The following examples will illustrate several ways in which the new shellac substitutes have been employed in preparing molding compositions particularly formulated for use in the manufacture of phonograph records:

*Example 4*

Parts by weight
Composition prepared as described in Example 1 _____ 10.0
Shellac _____ 12.0
Filler _____ 60.0

The above ingredients in the proportions specified were mixed on a heated two-roll mill until a completely homogeneous plastic mass was obtained. This mass was then removed from the rolls, and was formed into record pre-forms or "bisquits" before being allowed to cool. Records pressed from these pre-forms had an average impact strength of about 3100 lbs./sq. in., an average angle of bend of about 2.5°, an average modulus of elasticity of about 620,000 lbs./sq. in., and an average Rockwell hardness (M scale) of about 63. In comparison, records molded from similar compositions in which shellac alone was employed as the plastic base material had an average impact strength of about 3200 lbs./sq. in., an average angle of bend of about 2.5°, an average modulus of elasticity of about 625,000 lbs./sq. in., and an average Rockwell hardness of about 65.

*Example 5*

Parts by weight
Composition prepared as described in Example 1 _____ 6.5
Shellac _____ 12.0
Filler _____ 65.0
Carbon black pigment_____ 2.5
Zinc stearate_____ 0.3

The above ingredients in the proportions specified were thoroughly mixed in a steam-jacketed Banbury mixer, after which the plastic mass was removed from the mixer and pressed into pre-forms. Records pressed from these pre-forms had substantially the same strength characteristics as those described in Example 4.

It will be seen from the above examples that the compositions provided by the invention may be employed to replace at least about 50 per cent of the shellac used in making phonograph record molding compositions without any loss in the strength characteristics of the molded record. Furthermore, the records pressed from such compositions are characterized by good wearing qualities, low needle drag, and good dimensional stability. Phonographically, they are characterized by a high fidelity of sound reproduction which is maintained in loud passages, and a low level of background noise.

What I claim and desire to protect by Letters Patent is:

1. A thermoplastic composition comprising a substantial proportion of shellac, a mineral filler, and a composition consisting of between about 60 and 80% by weight of a substantially petroleum hydrocarbon insoluble pine wood resin, between about 10 and about 30% by weight of ethyl cellulose, and between about 5 and about 30% by weight of a plasticizing agent.

2. A thermoplastic composition comprising a substantial proportion of shellac, a mineral filler, and a composition consisting of between about 60 and 80% by weight of a substantially petroleum hydrocarbon insoluble pine wood resin, between about 10 and about 30% by weight of ethyl cellulose, and between about 5 and about 30% by weight of a natural glyceride plasticizing agent.

3. A thermoplastic composition comprising a substantial proportion of shellac, a mineral filler, and a composition consisting of between about 65 and 75% by weight of a substantially petroleum hydrocarbon insoluble pine wood resin, between about 15 and about 25% by weight of ethyl cellulose, and between about 5 and about 15% by weight of castor oil.

4. A phonograph record comprising a substantial proportion of shellac, a mineral filler, and a composition consisting of between about 60 and 80% by weight of a substantially petroleum hydrocarbon insoluble pine wood resin, between about 10 and about 30% by weight of ethyl cellulose, and between about 5 and about 30% by weight of a plasticizing agent.

5. A phonograph record comprising a substantial proportion of shellac, a mineral filler, a mold lubricant, and a composition consisting of between about 65 and 75% by weight of a substantially petroleum hydrocarbon insoluble pine wood resin, between about 15 and about 25% by weight of ethyl cellulose, and between about 5 and about 15% by weight of castor oil.

JOHN M. DE BELL.